(12) United States Patent
Luo et al.

(10) Patent No.: US 11,599,129 B2
(45) Date of Patent: Mar. 7, 2023

(54) MULTI-MODE MANIPULATED WATER OUTLET DEVICE

(71) Applicant: XIAMEN DELMEI SANITARY WARE CO., LTD., Xiamen (CN)

(72) Inventors: Weilong Luo, Xiamen (CN); Tao Ma, Xiamen (CN); Chunhua Wang, Xiamen (CN); Yongqiang Yan, Xiamen (CN)

(73) Assignee: XIAMEN DELMEI SANITARY WARE CO., LTD., Xiamen (CN)

( * ) Notice: Subject to any disclaimer, the term of this patent is extended or adjusted under 35 U.S.C. 154(b) by 198 days.

(21) Appl. No.: 17/202,392

(22) Filed: Mar. 16, 2021

(65) Prior Publication Data

US 2022/0214705 A1    Jul. 7, 2022

(30) Foreign Application Priority Data

Jan. 7, 2021 (CN) .......................... 202110017858.9
Jan. 7, 2021 (CN) .......................... 202120037302.1

(51) Int. Cl.
*G05D 7/00* (2006.01)
*E03C 1/04* (2006.01)

(52) U.S. Cl.
CPC .............. *G05D 7/005* (2013.01); *E03C 1/04* (2013.01)

(58) Field of Classification Search
CPC ........... E03C 1/057; E03C 1/04; E03C 1/055; G05D 23/1353; G05D 7/005

USPC ..................................................... 4/676, 677
See application file for complete search history.

(56) References Cited

U.S. PATENT DOCUMENTS

| | | | |
|---|---|---|---|
| 2009/0154524 A1* | 6/2009 | Girelli | E03C 1/0404 4/597 |
| 2013/0139920 A1* | 6/2013 | Wang | E03C 1/057 137/801 |
| 2020/0308815 A1* | 10/2020 | Chen | E03C 1/055 |
| 2020/0340221 A1* | 10/2020 | Peng | E03C 1/04 |
| 2020/0341498 A1* | 10/2020 | Birchfield | E03C 1/055 |
| 2021/0047213 A1* | 2/2021 | Mu | F16K 11/0782 |
| 2021/0278009 A1* | 9/2021 | Wang | E03C 1/055 |

* cited by examiner

*Primary Examiner* — Benjamin R Shaw
(74) *Attorney, Agent, or Firm* — Bayramoglu Law Offices LLC

(57) ABSTRACT

A multi-mode manipulated water outlet device includes a faucet body and a control box. The faucet body includes a main body, and a second induction unit, a first temperature control valve group, a first water inlet unit and a first water outlet unit that are fixedly disposed on the main body. The first water inlet unit and the first water outlet unit communicate with the first temperature control valve group. The control box includes a second temperature control valve group, and a second water inlet unit and a second water outlet unit communicating with the second temperature control valve group. The first water inlet unit communicates with the second water outlet unit. One flow path manipulation mode is provided through the first temperature control valve group, and another flow path manipulation mode is provided through the second induction unit, thereby providing two different control modes for operating the device.

10 Claims, 7 Drawing Sheets

MULTI-MODE MANIPULATED WATER OUTLET DEVICE

CROSS REFERENCE TO THE RELATED APPLICATIONS

This application is based upon and claims priority to Chinese Patent Applications No. 202110017858.9 and No. 202120037302.1, both filed on Jan. 7, 2021, the entire contents of which are incorporated herein by reference.

TECHNICAL FIELD

The present invention relates to sanitary product technology, and in particular to a multi-mode manipulated water outlet device.

BACKGROUND

Existing faucets can be divided into ordinary mechanically-manipulated faucets, inductively-manipulated faucets and others according to their manipulation modes. In a case where people want to manipulate the mechanically-manipulated faucet through induction to conveniently and quickly open or close the flow path, or the inductively-manipulated faucet fails to work when powered off, the faucet cannot be used. It is, therefore, highly desirable to provide a faucet with an integration of the two manipulation modes to meet user requirements.

SUMMARY

In order to solve the above-mentioned problems, the present invention provides a multi-mode manipulated water outlet device.

In order to realize the above-mentioned objective, the present invention adopts the following technical solution.

A multi-mode manipulated water outlet device includes: a faucet body and a control box. The faucet body includes a main body, and a second induction unit, a first temperature control valve group, a first water inlet unit and a first water outlet unit that are fixedly disposed on the main body. The first water inlet unit and the first water outlet unit communicate with the first temperature control valve group.

The control box includes a second temperature control valve group, and a second water inlet unit and a second water outlet unit communicating with the second temperature control valve group. The first water inlet unit communicates with the second water outlet unit.

When the first temperature control valve group is opened, water flows into the second water outlet unit from the second water inlet unit, then flows to the first water inlet unit, and then flows to the first water outlet unit via the first temperature control valve group.

When the second induction unit is triggered, water flows into the second water outlet unit from the second water inlet unit, then flows to the second temperature control valve group, and then flows to the first water outlet unit via the first water inlet unit.

Preferably, the main body is further provided with a first induction unit adjacent to the first temperature control valve group, and the first induction unit is triggered to turn off a trigger signal of the second induction unit.

Preferably, the second induction unit is electrically connected to the first induction unit.

Preferably, the second induction unit is electrically connected to the control box.

Preferably, the second water outlet unit includes a first water outlet hole, a cold-water outlet hole and a mixed-water outlet hole. The second water inlet unit includes a hot-water inlet hole and a cold-water inlet hole. The hot-water inlet hole and the first water outlet hole are disposed in a hot-water pipe. The cold-water inlet hole and the cold-water outlet hole are disposed in a cold-water pipe. The mixed-water outlet hole is disposed in a mixed-water pipe. The hot-water pipe is further provided with a hot-water passing hole. The cold-water pipe is further provided with a cold-water passing hole. The mixed-water pipe is further provided with a mixed-water passing hole.

Preferably, the second temperature control valve group includes a valve seat fixedly disposed in the cavity, a second valve core disposed in the valve seat, and a second switch sleeved on the second valve core to control the second valve core. The valve seat has a valve cavity for receiving the second valve core, and a hot-water passing port, a cold-water passing port and a mixed-water passing port communicating with the valve cavity. The hot-water passing port communicates with the hot-water passing hole. The cold-water passing port communicates with the cold-water passing hole. The mixed-water passing port communicates with the mixed-water passing hole.

Preferably, the first water inlet unit includes a hot-water inlet, a cold-water inlet and a mixed-water inlet. The first water outlet hole communicates with the hot-water inlet. The cold-water outlet hole communicates with the cold-water inlet. The mixed-water outlet hole communicates with the mixed-water inlet. The mixed-water inlet communicates with the first water outlet unit.

Preferably, the first temperature control valve group includes a first valve core fixedly disposed on the main body and a first switch sleeved on the first valve core to control the first valve core. The hot-water inlet and the cold-water inlet communicate with the first valve core.

Preferably, the first water outlet unit is movably and fixedly disposed on the main body or integrally disposed with the main body, and communicates with the first valve core.

Preferably, the control box further includes a solenoid valve and a chip set. The solenoid valve is connected to the flow path between the mixed-water passing hole and the second valve core. The chip set is electrically connected to the solenoid valve to control the solenoid valve to be opened or closed, and the chip set is electrically connected to the second induction unit.

The advantages of the present invention are as follows.

1). The second induction unit, the first temperature control valve group, the first water inlet unit and the first water outlet unit are disposed on the faucet body. The second temperature control valve group, the second water inlet unit and the second water outlet unit are disposed on the control box. The first water inlet unit communicates with the second water outlet unit. In this arrangement, by opening and closing the first temperature control valve group, the water may flow into the second water outlet unit from the second water inlet unit, then flows to the first water inlet unit and then flows to the first water outlet unit via the first temperature control valve group to provide a flow path manipulation mode. The second induction unit is triggered to open and close the flow path, so that the water flows into the second water outlet unit from the second water inlet unit, then flows to the second temperature control valve group, and then flows to the first water outlet unit via the first water inlet unit to provide another flow path manipulation mode. In this way, two manipulated water outlet modes are provided in one water outlet device to not only facilitate quick manipulation of the mechanically-manipulated faucet to overcome the inconvenience of the mechanically-manipulated faucet, but also enable the inductively-manipulated faucet to continue working when it is powered off, thereby providing various options for users.

2). The first induction unit is configured to control the second induction unit to be turned off to avoid the situation where the flow path is mistakenly opened by triggering the second induction unit in a mechanical manipulation mode, while reducing the workload of components to prolong service life.

BRIEF DESCRIPTION OF THE DRAWINGS

The drawings described herein are used to provide a further understanding of the present invention and constitute a part of the present invention. The exemplary embodiments of the present invention and descriptions thereof are used to explain the present invention, and do not constitute improper limitations to the present invention. In the drawings.

In the figures.

1. faucet body; 11. main body; 12. first temperature control valve group; 121. first valve core; 1211. gland; 122. first switch; 1221. handle; 13. first water outlet unit; 14. second induction unit; 15. hot-water inlet; 16. cold-water inlet; 17. mixed-water inlet; 18. first induction unit;

2. control box; 21. lower cover; 22. upper cover; 23. second temperature control valve group; 231. valve seat; 232. second valve core; 233. second switch; 235. hot-water passing port; 236. cold-water passing port; 237. mixed-water passing port; 24. solenoid valve; 25. hot-water pipe; 251. hot-water inlet hole; 252. first water outlet hole; 253. hot-water passing hole; 26. cold-water pipe; 261. cold-water inlet hole; 262. cold-water outlet hole; 263. cold-water passing hole; 27. mixed-water pipe; 271. mixed-water passing hole; 272. mixed-water outlet hole; 28. chip set; 281. power interface; and 282. induction interface.

DETAILED DESCRIPTION OF THE EMBODIMENTS

In order to make the technical problem to be solved, technical solutions and advantages of the present invention clearer, the present invention will be further explained below in conjunction with the drawings and embodiments. It should be understood that the described specific embodiments herein are only used to explain the present invention, rather than to limit the present invention.

Figure 1:
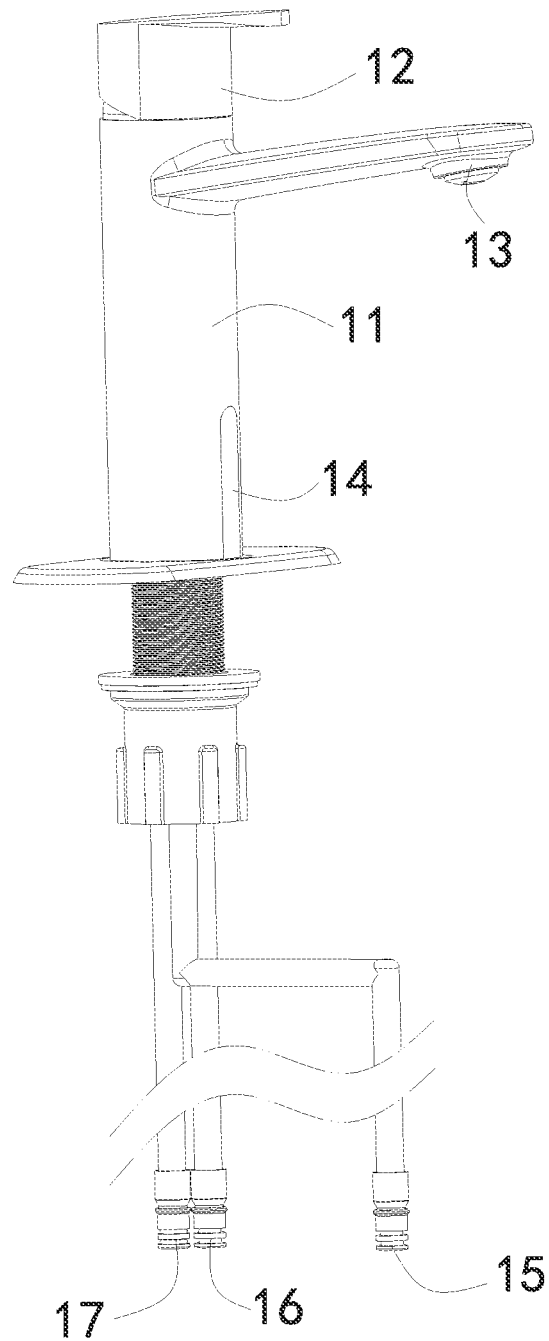
FIG. 1 is a structural schematic diagram of a faucet body of a multi-mode manipulated water outlet device of the present invention.
Figure 2:
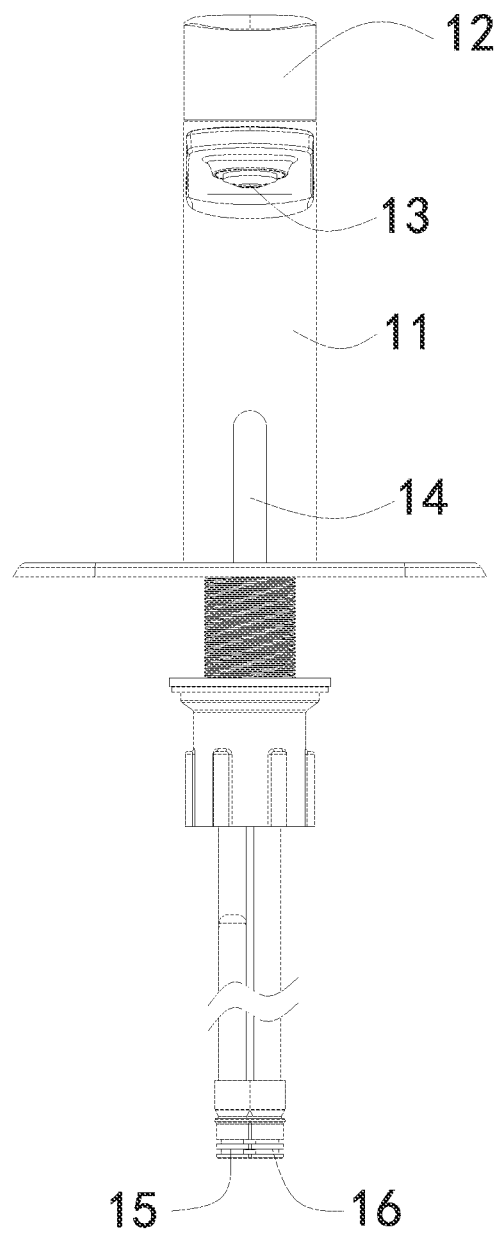
FIG. 2 is a main view of the faucet body of the multi-mode manipulated water outlet device of the present invention.
Figure 3:
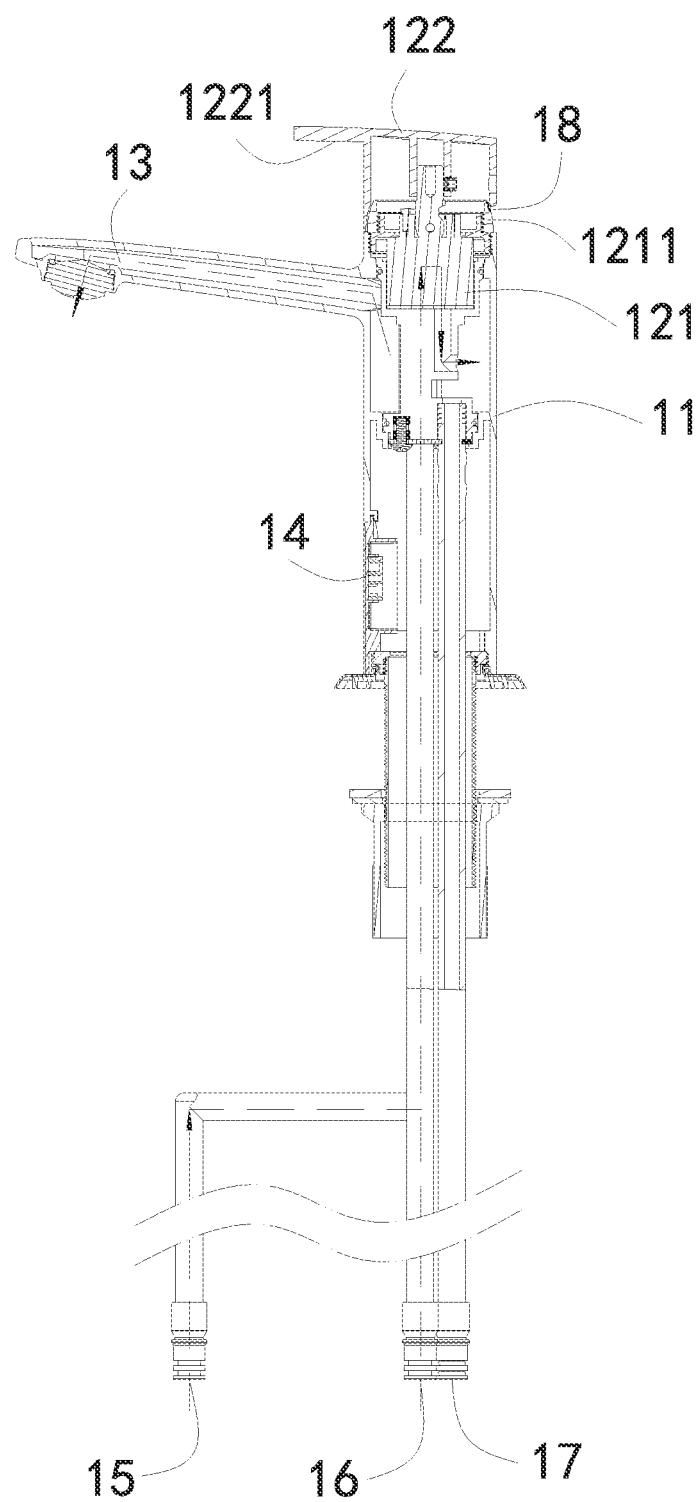
FIG. 3 is a first cross-sectional view of the faucet body of the multi-mode manipulated water outlet device of the present invention.
Figure 4:
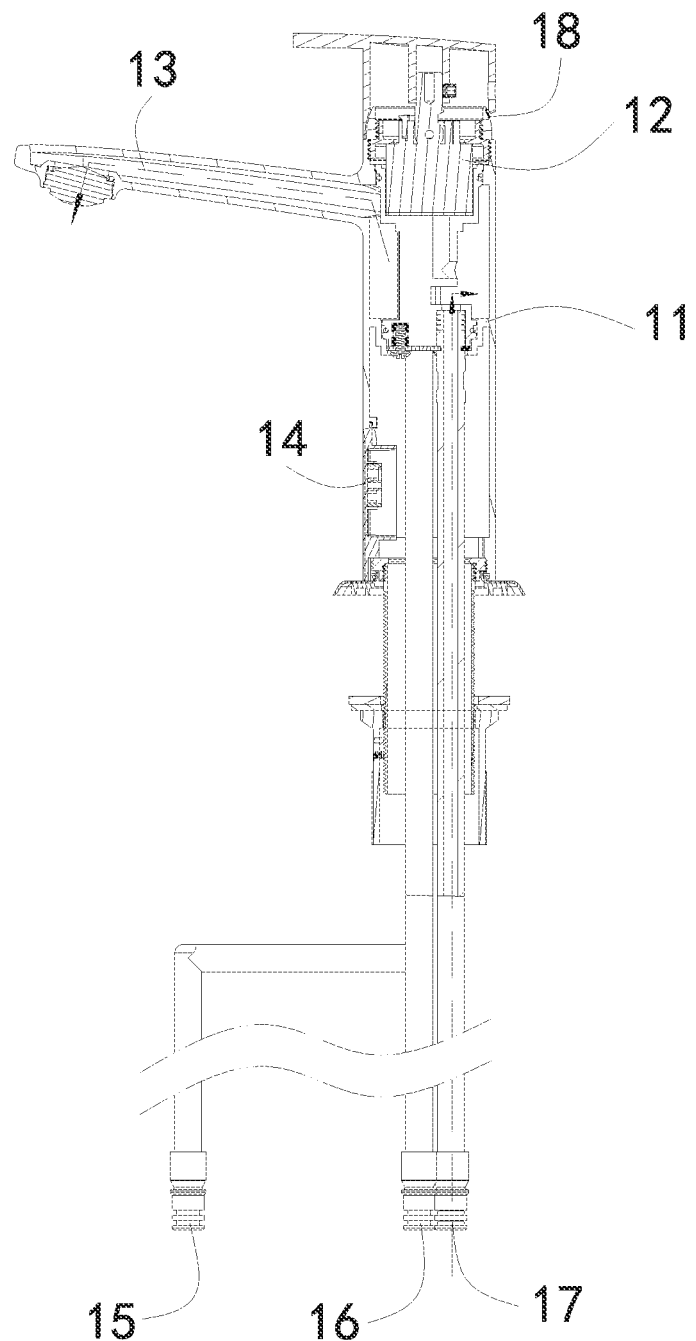
FIG. 4 is a second cross-sectional view of the faucet body of the multi-mode manipulated water outlet device of the present invention.
Figure 5:
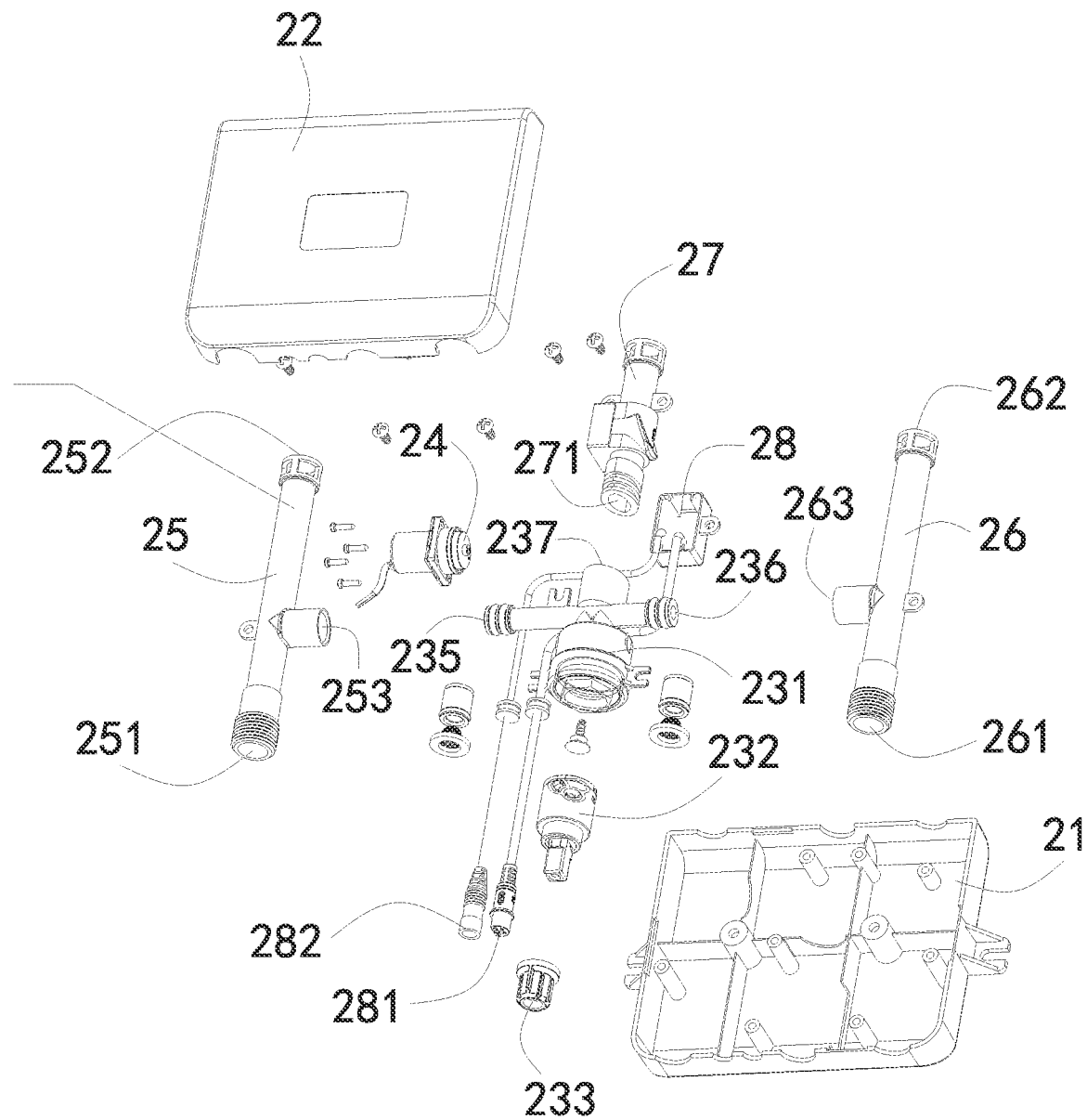
FIG. 5 is an exploded view of a control box of the multi-mode manipulated water outlet device of the present invention.
Figure 6:
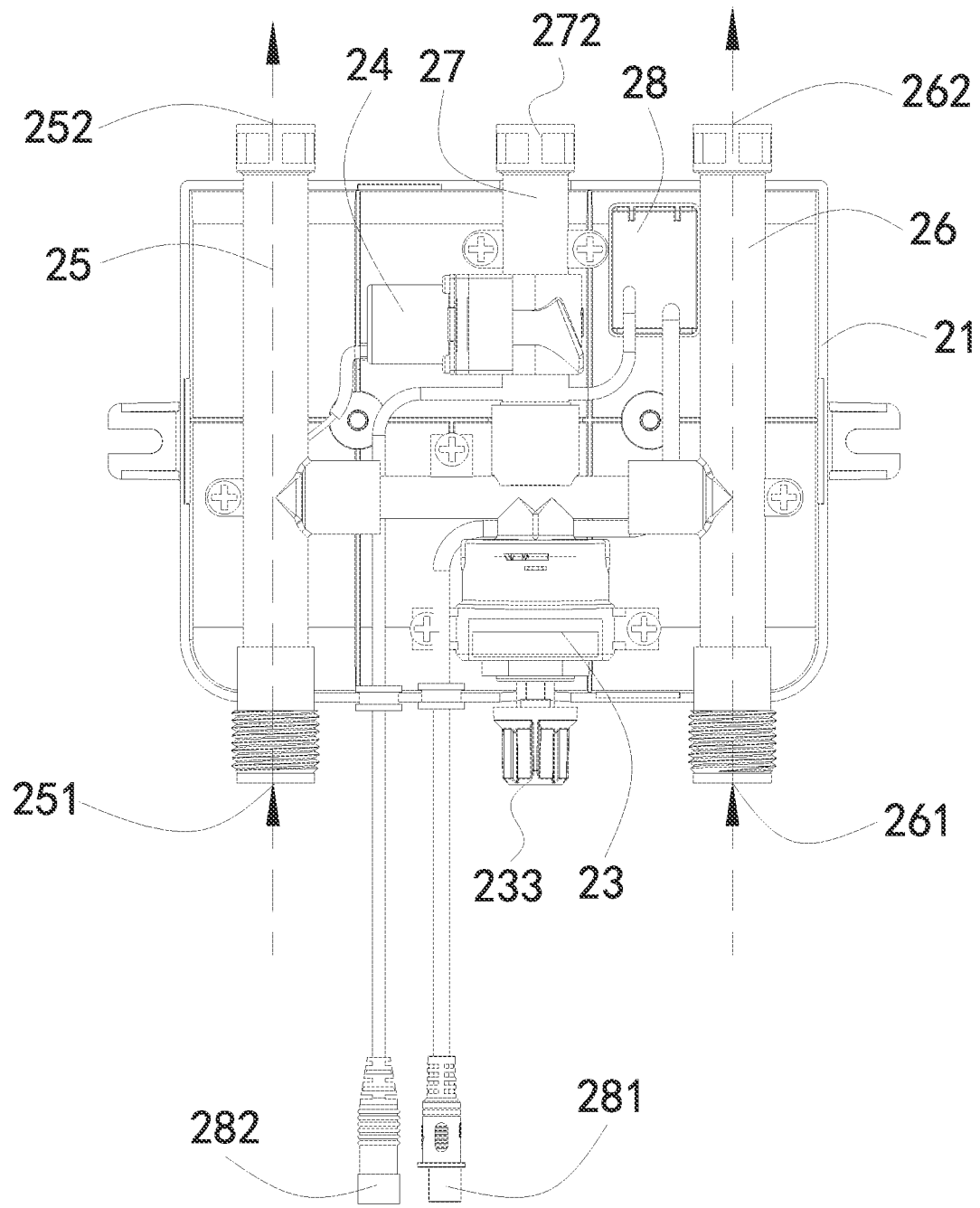
FIG. 6 is a first structural schematic diagram of the multi-mode manipulated water outlet device of the present invention.
Figure 7:
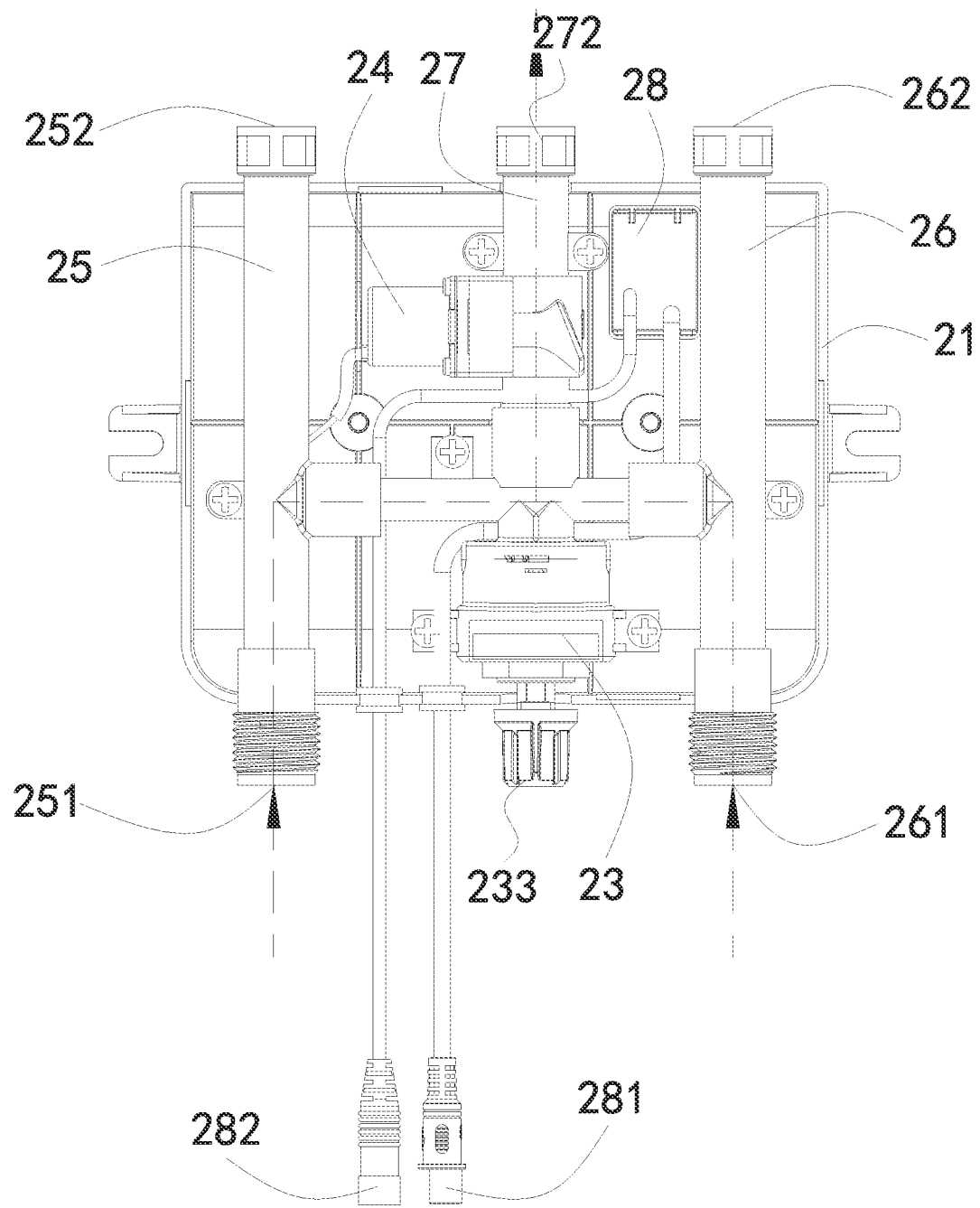
FIG. 7 is a second structural schematic diagram of the multi-mode manipulated water outlet device of the present invention.

As shown in FIGS. 1-7, according to a preferred embodiment of the present invention, a multi-mode manipulated water outlet device includes the faucet body 1 and the control box 2. The faucet body 1 includes the main body 11. The main body 11 is provided with a cavity, and the first temperature control valve group 12 is fixedly provided on the cavity. The first water inlet unit and the first water outlet unit 13 that communicate with the first temperature control valve group 12 penetrates the cavity. Further, the second induction unit 14 is fixedly provided on the outer surface of the main body 11, and the second induction unit 14 is electrically connected to the control box 2 to control the control box 2 to control water supply. The control box 2 includes a box body that is a cavity formed by assembling the upper cover 22 with the lower cover 21. The second temperature control valve group 23, and a second water inlet unit and a second water outlet unit communicating with the second temperature control valve group 23 are provided in the cavity. The first water inlet unit communicates with the second water outlet unit. When the first temperature control valve group 12 is opened, water is allowed to flow into the second water outlet unit from the second water inlet unit, then flows to the first water inlet unit, and then flows to the first water outlet unit 13 via the first temperature control valve group 12. When the second induction unit 14 is triggered, water flows into the second water outlet unit from the second water inlet unit, then to the second temperature control valve group 23, and then flows to the first water outlet unit 13 via the first water inlet unit.

The first temperature control valve group 12 includes the first valve core 121 fixedly disposed on the main body 11 and the first switch 122 sleeved on the first valve core 121 to control the first valve core 121. In the present embodiment, the first valve core 121 is a mixing valve, and the first switch 122 is inserted into the mixing valve. The mixing valve is opened or closed by lifting up or pressing down the handle 1221 of the first switch 122, and the hot-water and cold-water output ratio of the mixing valve is adjusted by rotating the first switch 122 to the left and right. The first water inlet unit includes three hoses. One end of each of two hoses communicates with the first valve core 121, one end of the remaining hose is directly in communication with the first water outlet unit 13, and the other end of each of the three hoses has an interface. The three interfaces are the hot-water inlet 15, the cold-water inlet 16 and the mixed-water inlet 17, respectively. The first water outlet unit 13 is movably and fixedly disposed on the main body 11 or integrally disposed with the main body 11, and communicates with the first valve core 121. The water flows into the first valve core 121 from the hot-water inlet 15, the cold-water inlet 16 and the mixed-water inlet 17, respectively, and then flows out from the first water outlet unit 13.

The second temperature control valve group 23 includes the valve seat 231 fixedly disposed in the cavity, the second valve core 232 disposed in the valve seat 231, and the second switch 233 sleeved on the second valve core 232 to control the second valve core 232. The valve seat 231 has a valve cavity for receiving the second valve core 232, and the hot-water passing port 235, the cold-water passing port 236 and the mixed-water passing port 237 communicating with the valve cavity. The second valve core 232 adopts a mixing valve or a thermostatic valve. In the present embodiment, the second valve core 232 adopts a thermostatic valve, and the second switch 233 adopts a knob and is inserted into a connecting rod of the thermostatic valve. The outlet water temperature of the thermostatic valve can be set by rotating the knob. The outlet water temperature is set according to the user's requirements when leaving the factory, and can be adjusted as needed after manually opening the upper cover 22. After the outlet water temperature has been adjusted, the upper cover 22 is closed and fastened. The second water outlet unit includes the first water outlet hole 252, the cold-water outlet hole 262 and the mixed-water outlet hole 272. The second water inlet unit includes the hot-water inlet hole 251 and the cold-water inlet hole 261. The hot-water inlet hole 251 and the first water outlet hole 252 are disposed in the hot-water pipe 25. The cold-water inlet hole 261 and the cold-water outlet hole 262 are disposed in the cold-water pipe 26. The mixed-water outlet hole 272 is disposed in the mixed-water pipe 27. The hot-water pipe 25 is further provided with the hot-water passing hole 253. The cold-water pipe 26 is further provided with the cold-water passing hole 263. The mixed-water pipe 27 is further provided with the mixed-water passing hole 271. The hot-water passing port 235 communicates with the hot-water passing hole 253. The cold-water passing port 236 communicates with the cold-water passing hole 263. The mixed-water passing port 237 communicates with the mixed-water passing hole 271. The first water outlet hole 252 communicates with the hot-water inlet 15. The cold-water outlet hole 262 communicates with the cold-water inlet 16. The mixed-water outlet hole 272 communicates with the mixed-water inlet 17. The mixed-water inlet 17 communicates with the first water outlet unit 13. The water flows in from the hot-water inlet hole 251 and the cold-water inlet hole 261, and then flows to the hot-water inlet 15 and the cold-water inlet 16 from the first water outlet hole 252 and the cold-water outlet hole 262. Alternatively, the water flows in from the hot-water inlet hole 251 and the cold-water inlet hole 261, then flows to the hot-water passing port 235 and the cold-water passing port 236 from the hot-water passing hole 253 and the cold-water passing hole 263, and then flows to the mixed-water passing port 237 via the second valve core 232 to flow to the mixed-water passing hole 271, so as to flow to the mixed-water inlet 17 from the mixed-water outlet hole 272.

Further, the solenoid valve 24 and the chip set 28 are fixedly provided in the cavity. The solenoid valve 24 is connected to the flow path between the mixed-water passing hole 271 and the second valve core 232. The chip set 28 is electrically connected to the solenoid valve 24. The chip set 28 further includes the induction interface 282 and the power interface 281. The induction interface 282 is electrically connected to the second induction unit 14, and the power interface 281 is connected to an external power supply to enable the chip set 28 to work while supplying power to the second induction unit 14 and the solenoid valve 24 to enable them to work. In the present embodiment, the second induction unit 14 adopts an infrared induction structure, To open the flow path, the user only needs to put his/her hand in a position close to the infrared induction structure, so that the second induction unit 14 receives a flow path opening instruction to trigger the second induction unit 14 to control the chip set 28 to work, that is, transmit the instruction to the chip set 28 to enable the chip set 28 to control the solenoid valve 24 to be opened to open the flow path. After the water flows for a period of time, the solenoid valve 24 stops working to close the flow path, and the water passage work duration of the solenoid valve 24 can be preset according to the user's requirement. When the solenoid valve 24 starts to work, the water flows into the second valve core 232 respectively from the hot-water inlet hole 251 and the cold-water inlet hole 261 for mixing. The second valve core 232 can preset the water temperature according to the user's requirement. After being mixed in the second valve core 232, the water flows to the mixed-water passing hole 271 via the solenoid valve 24 to flow to the mixed-water passing port 237, and then flows to the mixed-water inlet 17 to enter the faucet body 1 and flows out from the first water outlet unit 13 for use. It is also feasible to directly put one hand proximate the infrared induction structure, so that the second induction unit 14 triggers a flow path closing instruction and transmits the water closing instruction to the chip set 28 to close the solenoid valve 24 to close the flow path.

In this way, the water outlet device can not only work in a mode in which the first switch 122 controls the first valve core 121 to mechanically open the flow path, but also can work in another mode in which the second induction unit 14 controls the solenoid valve 24 to enable the second valve core 232 to inductively open the flow path. However, a mistake in the mode in which the flow path is mechanically opened and closed may cause the second induction unit 14 to receive an induction signal to trigger the chip set 28 so as to make the solenoid valve 24 work to open the inductively opened and closed flow path. In this case, it is easy to cause a control disorder to increase the burden of the user during use, and also increase the work burden of the components to reduce the service life. In this regard, the main body 11 is further provided with the first induction unit 18 adjacent to the first temperature control valve group 12. The first induction unit 18 is triggered to turn off the trigger signal of the second induction unit 14, so as to ensure that the second induction unit 14 will not generate the induction signal to open the inductively opened and closed flow path. The first induction unit 18 adopts a contact switch, a Hall switch, a travel switch, or other known suitable switch. In the present embodiment, the first induction unit 18 adopts the contact switch, and the first induction unit 18 is disposed at one end of the first switch 122 adjacent to the gland 1211 of the first valve core 121. When the handle 1221 of the first switch 122 is lifted up, one end of the first switch 122 away from the handle 1221 is pressed down and contacts the first induction unit 18, and the first induction unit 18 senses that the first switch 122 turns on and off the work of the second induction unit 14. The first induction unit 18 can also be disposed inside the handle 1221 of the first switch 122. When a user operates the first switch 122, the user's hand contacts the first induction unit 18 to trigger the first induction unit 18 to turn off the work of the second induction unit 14. Any position where the first induction unit 18 can receive the work of the first switch 122 shall fall within the scope of protection of the position where the first induction unit 18 is disposed. The first induction unit 18 is electrically connected to the second induction unit 14.

The working principle of the present invention is briefly described as follows.

During normal use, the second switch 233 is turned on to open the second valve core 232, and the first induction unit 18 is triggered so that the second induction unit 14 is turned off and thus fails to transmit the signal to the chip set 28 for working. The hot water flows in from the hot-water inlet hole 251 and flow to the hot-water inlet 15 from the first water outlet hole 252. The cold water flows in from the cold-water inlet hole 261 and flows to the cold-water inlet 16 from the cold-water outlet hole 262. The hot water and the cold water are mixed through the first valve core 121, and then flow out from the first water outlet unit 13 for use. The second switch 233 is turned off to turn off the work of the second valve core 232 to close and disconnect the flow path.

When the second switch 233 does not open the second valve core 232 to work, the second induction unit 14 is used to receive the induction signal and transmit the signal to the chip set 28 so that the chip set 28 controls the solenoid valve 24 to be opened to open the flow path. In this way, the hot water flows in from the hot-water inlet hole 251, flows to the hot-water passing port 235 from the hot-water passing hole 253 to flow to the second valve core 232. The cold water flows in from the cold-water inlet hole 261 and flows to the cold-water passing port 236 from the cold-water passing hole 263 to flow to the second valve core 232. After being mixed through the second valve core 232, the hot water and the cold water flow to the solenoid valve 24 from the mixed-water passing hole 271 to flow to the mixed-water passing port 237, then flow to the mixed-water inlet 17 from the mixed-water outlet hole 272, and then flow to the first water outlet unit 13 for use. After working for a set time, the solenoid valve 24 is closed to close and disconnect the flow path. Alternatively, the second induction unit 14 receives a closing induction signal and transmits the signal to the chip set 28 to control the solenoid valve 24 to be closed to close and disconnect the flow path.

In the present invention, the second induction unit 14, the first temperature control valve group 12, the first water inlet unit and the first water outlet unit are disposed on the faucet body 1. The second temperature control valve group 23, the second water inlet unit and the second water outlet unit are disposed on the control box 2. The first water inlet unit communicates with the second water outlet unit. In this arrangement, by opening and closing the first temperature control valve group 12, the water flows into the second water outlet unit from the second water inlet unit, then flows to the first water inlet unit and then flows to the first water outlet unit via the first temperature control valve group 12 to provide a flow path manipulation mode. The second induction unit 14 is triggered to open and close the flow path, so that the water flows into the second water outlet unit from the second water inlet unit, then flows to the second temperature control valve group 23, and then flows to the first water outlet unit via the first water inlet unit to provide another flow path manipulation mode. In this way, two manipulated water outlet modes are provided in one water outlet device to not only facilitate quickly manipulating the mechanically-manipulated faucet, but also enable the inductively-manipulated faucet to continue to keep working when it is powered off, thereby providing various operating conveniences for users. The first induction unit 18 is configured to control the second induction unit 14 to be turned off to avoid the situation where the flow path is mistakenly opened by triggering the second induction unit 14 in a mechanical manipulation mode, while reducing the workload of components to prolong the service life The above explanations illustrate and describe the preferred embodiments of the present invention. As mentioned above, it should be understood that the present invention is not limited to the form disclosed herein, and should not be regarded as an exclusion of other embodiments, but can be applied to other various combinations, modifications and environments, and can be modified through the above teachings or technology or knowledge in related fields within the scope of the inventive concept described herein. However, modifications and changes made by those skilled in the art do not depart from the spirit and scope of the present invention, and shall fall within the scope of protection of the appended claims of the present invention.

What is claimed is:

1. A multi-mode manipulated water outlet device, comprising:
    a faucet body and a control box;
    wherein
    the faucet body comprises a main body, a second induction unit, a first temperature control valve group, a first water inlet unit and a first water outlet unit;
    the second induction unit, the first temperature control valve group, the first water inlet unit and the first water outlet unit are fixedly disposed on the main body;
    the first water inlet unit and the first water outlet unit communicate with the first temperature control valve group;
    the control box comprises a second temperature control valve group, a second water inlet unit and a second water outlet unit;
    the second water inlet unit and the second water outlet unit communicate with the second temperature control valve group, and the first water inlet unit communicates with the second water outlet unit;
    when the first temperature control valve group is opened, water flows into the second water outlet unit from the second water inlet unit, then the water flows to the first water inlet unit, and then the water flows to the first water outlet unit via the first temperature control valve group; and
    when the second induction unit is triggered, the water flows into the second water outlet unit from the second water inlet unit, then the water flows to the second temperature control valve group, and then the water flows to the first water outlet unit via the first water inlet unit.

2. The multi-mode manipulated water outlet device of claim 1, wherein
    the main body is further provided with a first induction unit adjacent to the first temperature control valve group, and the first induction unit is triggered to turn off a trigger signal of the second induction unit.

3. The multi-mode manipulated water outlet device of claim 2, wherein
    the second induction unit is electrically connected to the first induction unit.

4. The multi-mode manipulated water outlet device of claim 1, wherein
    the second induction unit is electrically connected to the control box.

5. The multi-mode manipulated water outlet device of claim 1, wherein
    the second water outlet unit comprises a first water outlet hole, a cold-water outlet hole and a mixed-water outlet hole;
    the second water inlet unit comprises a hot-water inlet hole and a cold-water inlet hole;
    the hot-water inlet hole and the first water outlet hole are disposed in a hot-water pipe;
    the cold-water inlet hole and the cold-water outlet hole are disposed in a cold-water pipe;
    the mixed-water outlet hole is disposed in a mixed-water pipe;
    the hot-water pipe is further provided with a hot-water passing hole;
    the cold-water pipe is further provided with a cold-water passing hole; and
    the mixed-water pipe is further provided with a mixed-water passing hole.

6. The multi-mode manipulated water outlet device of claim 5, wherein
the second temperature control valve group comprises a valve seat fixedly disposed in a cavity of the control box, a second valve core disposed in the valve seat, and a second switch sleeved on the second valve core to control the second valve core;
the valve seat has a valve cavity, a hot-water passing port, a cold-water passing port and a mixed-water passing port;
the valve cavity is configured for receiving the second valve core;
the hot-water passing port, the cold-water passing port and the mixed-water passing port communicate with the valve cavity;
the hot-water passing port communicates with the hot-water passing hole;
the cold-water passing port communicates with the cold-water passing hole; and
the mixed-water passing port communicates with the mixed-water passing hole.

7. The multi-mode manipulated water outlet device of claim 5, wherein
the first water inlet unit comprises a hot-water inlet, a cold-water inlet and a mixed-water inlet;
the first water outlet hole communicates with the hot-water inlet;
the cold-water outlet hole communicates with the cold-water inlet;
the mixed-water outlet hole communicates with the mixed-water inlet; and
the mixed-water inlet communicates with the first water outlet unit.

8. The multi-mode manipulated water outlet device of claim 7, wherein
the first temperature control valve group comprises a first valve core fixedly disposed on the main body and a first switch sleeved on the first valve core to control the first valve core, and
the hot-water inlet and the cold-water inlet communicate with the first valve core.

9. The multi-mode manipulated water outlet device of claim 8, wherein
the first water outlet unit is movably and fixedly disposed on the main body or the first water outlet unit is integrated with the main body, and
the first water outlet unit communicates with the first valve core.

10. The multi-mode manipulated water outlet device of claim 6, wherein
the control box further comprises a solenoid valve and a chip set;
the solenoid valve is connected to a flow path between the mixed-water passing hole and the second valve core;
the chip set is electrically connected to the solenoid valve to control the solenoid valve to be opened and closed; and
the chip set is electrically connected to the second induction unit.

* * * * *